(12) United States Patent
Karasikov et al.

(10) Patent No.: US 8,611,620 B2
(45) Date of Patent: Dec. 17, 2013

(54) ADVANCED DIGITAL PATHOLOGY AND PROVISIONS FOR REMOTE DIAGNOSTICS

(75) Inventors: Nir Karasikov, Haifa (IL); Jona Sela, Tel Aviv (IL); Uri Dubin, Haifa (IL); Gal Goshen, Jerusalem (IL)

(73) Assignee: Ardia Medical Products Ltd., Haifa (IL)

( * ) Notice: Subject to any disclaimer, the term of this patent is extended or adjusted under 35 U.S.C. 154(b) by 260 days.

(21) Appl. No.: 13/175,130

(22) Filed: Jul. 1, 2011

(65) Prior Publication Data

US 2012/0002852 A1    Jan. 5, 2012

Related U.S. Application Data

(60) Provisional application No. 61/360,518, filed on Jul. 1, 2010.

(51) Int. Cl.
*G06K 9/00*    (2006.01)
(52) U.S. Cl.
USPC ........................................... 382/128; 128/922
(58) Field of Classification Search
USPC ................. 382/100, 128, 129, 130, 131, 132, 382/260–265; 128/922; 378/4–27
See application file for complete search history.

(56) References Cited

U.S. PATENT DOCUMENTS

| | | | |
|---|---|---|---|
| 5,757,954 A * | 5/1998 | Kuan et al. | 382/133 |
| 5,854,851 A * | 12/1998 | Bamberger et al. | 382/132 |
| 5,974,159 A * | 10/1999 | Lubin et al. | 382/106 |
| 6,591,004 B1 * | 7/2003 | VanEssen et al. | 382/154 |
| 7,826,652 B2 * | 11/2010 | Hunt | 382/133 |
| 7,989,209 B2 * | 8/2011 | Marcelpoil et al. | 436/63 |
| 8,027,533 B2 * | 9/2011 | Li et al. | 382/167 |
| 2004/0126008 A1 * | 7/2004 | Chapoulaud et al. | 382/156 |
| 2006/0083418 A1 * | 4/2006 | Watson et al. | 382/133 |
| 2012/0321151 A1 * | 12/2012 | Zohrer et al. | 382/128 |

\* cited by examiner

*Primary Examiner* — Anand Bhatnagar
(74) *Attorney, Agent, or Firm* — The Law Office of Michael E. Kondoudis

(57) ABSTRACT

The present invention discloses a method for detecting and identifying pathologies in a magnified captured image. The method comprising the step of: performing macro image analysis for identifying abnormal and normal segments of the captured image, performing conversion of colored images to gray scale image, performing segmentation of the gray scale colored biopsy by applying two segmentation levels, merging the image results of the coarse level and the fine level segmentations by expanding the coarse image to fit scale of the fine image and identifying pixels having the same value at both levels, performing comparison between object's properties and characteristics appearing in abnormal segments and object's properties and characteristics appearing in normal segments, and calculating the deviations of each property between the abnormal segments and the normal segments and ranking objects based on the calculated deviations of each property and characteristic.

21 Claims, 20 Drawing Sheets
(20 of 20 Drawing Sheet(s) Filed in Color)

Fig. 14A
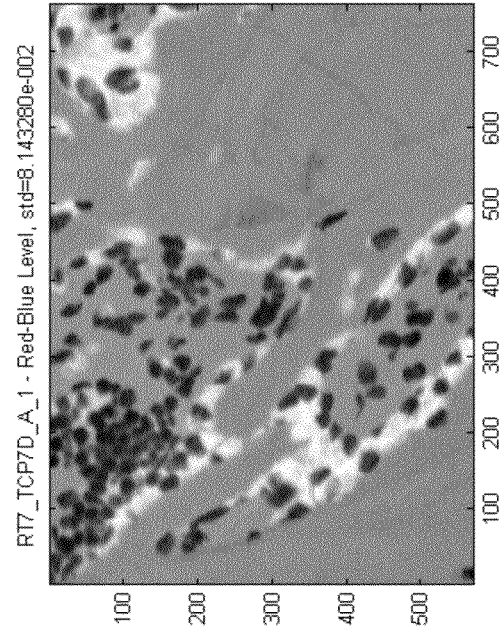
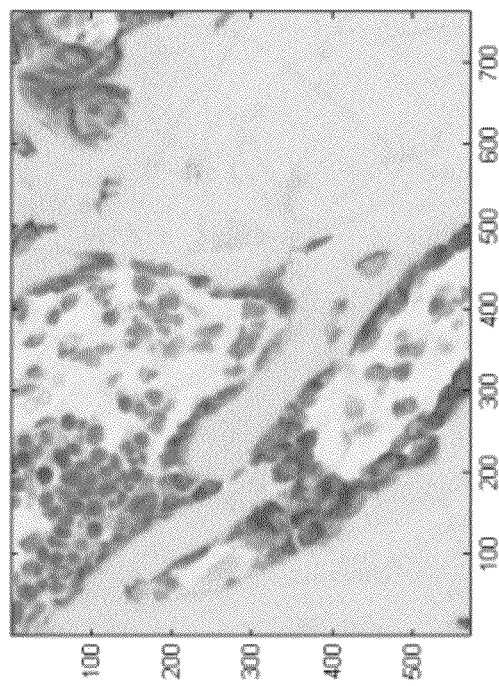
Fig. 14B

ADVANCED DIGITAL PATHOLOGY AND PROVISIONS FOR REMOTE DIAGNOSTICS

CROSS-REFERENCE TO RELATED PATENT APPLICATIONS

This application, claims the priority of provisional application No. 61/360,518 filed on 1 Jul. 2010.

BACKGROUND

Known in the art systems for diagnosing biopsy image for identifying pathologies provide the experts only with improved stained images, requiring human experts to do most diagnostic processing.

TECHNICAL FIELD

The present invention relates to the field of image processing and more specifically to identification of abnormal images of biology biopsy.

BRIEF SUMMARY

The present invention discloses a method for detecting and identifying pathologies in a magnified captured image. The method comprising the step of: capturing biopsy of an organ of a human body, performing macro image analysis for identifying abnormal and normal segments of the captured image, said analysis based on image texture features extraction and analysis, performing conversion of colored images to gray scale image, by applying transformation for each pixel in the image according to pre-defined formula having calculated weights, said transformation is arranged to adjust the colors to normalize the technical effects of lighting conditions, capturing technique or capturing device type, performing segmentation of the gray scale colored biopsy by applying two segmentation levels, a first coarse level performed by applying different low pass filters on down sized gray scale image for detecting smooth background image and small objects, a fine segmentation level by applying filters on the original size gray scale image for detecting smooth background image and small objects, merging the image results of the coarse level and the fine level segmentations by expanding the coarse image to fit scale of the fine image and identifying pixels having the same value at both levels, performing measurements of the detected small objects identifying objects properties and characteristics, performing comparison between object's properties and characteristics appearing in abnormal segments and object's properties and characteristics appearing in normal segments, and calculating the deviations of each property between the abnormal segments and the normal segments and ranking objects based on the calculated deviations of each property and characteristic, wherein each property and characteristic has different weight factor determined on the basis of biopsy/organ type;

According to some embodiment of the present invention the method further include the step of determining suspected objects as pathological or malignant objects based on the objects ranking.

According to some embodiment of the present invention the tested biopsy is of lymph cells and the object's properties and characteristics appearing in abnormal segments are compared to segments which were determined as pathological or malignant in the detecting and identifying pathologies process applied on biopsy taken from the same human body.

According to some embodiments of the present invention the method further include the steps of: automatically staining biopsy cells, wherein objects which were detected thought the segmentation and analyzing processing as abnormal are colored differently than normal object and performing quantitative calculation of the colored images for preparing statistics of the cells properties enabling to compare the properties between normal and abnormal cells;

According to some embodiment of the present invention the macro image analysis includes the usage of multi-scale filtering techniques for analyzing image features and using local image histograms for identifying texture properties and characteristics in different area of images.

According to some embodiment of the present invention the conversion methods provides predefined algorithm adapted to specific staining techniques;

According to some embodiment of the present invention the segmentation module calculates the difference between Background and Object filtered by comparing to the threshold computed by Otsu's method.

According to some embodiment of the present invention the weight factor for the ranking module are determined according heuristic human pathologist knowledge translated to classification algorithms and weighted by FL.

According to some embodiment of the present invention the method further includes the steps of: using conventional feature extraction techniques for identifying the lymphocytes and deleting the identified lymphocytes from the image.

According to some embodiments the present invention discloses a system for detecting and identifying pathologies in a magnified captured image. The system is comprised of: capturing module enabling to capture biopsy of an organ of a human body, macro image analysis module for identifying abnormal and normal segments of the captured image, said analysis based on image texture features extraction and analysis, a gray scale conversion module which apply transformation for each pixel in the image according to pre-defined formula having calculated weights, said transformation is arranged to adjust the colors to normalizing the technical effects of lighting conditions, capturing technique or capturing device type, a Dual segmentation module for applying two segmentation processing levels on the gray scale colored biopsy image, wherein at a first coarse level different low pass filters are applied on down sized gray scale image for detecting smooth background image and small objects and a fine segmentation level, different low pass filters are applied on the original size gray scale image for detecting smooth background image and small objects, wherein the image results of the coarse level and the fine level segmentations are merged by expanding the coarse image to fit scale of the fine image and identifying pixels having the same value at both levels, a Comparison module for comparing between measured object's properties and characteristics appearing in abnormal segments and measured object's properties and characteristics appearing in normal segments, and calculating the deviations of each property between the abnormal segments and the normal segments; and a ranking module for indexing objects based on the calculated deviations of each property and characteristic, wherein each property and characteristic has different weight factor determined on the basis of biopsy/organ type.

According to some embodiments of the present invention the method further includes detecting the presence of malignant cells by analyzing the color components of a global camera field of view.

According to some embodiment of the present invention the capture module is implemented in mobile phone configuration associated with an optic magnifying lens, test slide and illumination source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will be more readily understood from the detailed description of embodiments thereof made in conjunction with the accompanying drawings of which:

FIGS. 14A, 14B, 14C and 14D demonstrate the quantitative calculation results according to some embodiments of the invention;

DETAILED DESCRIPTION

Figure 1:
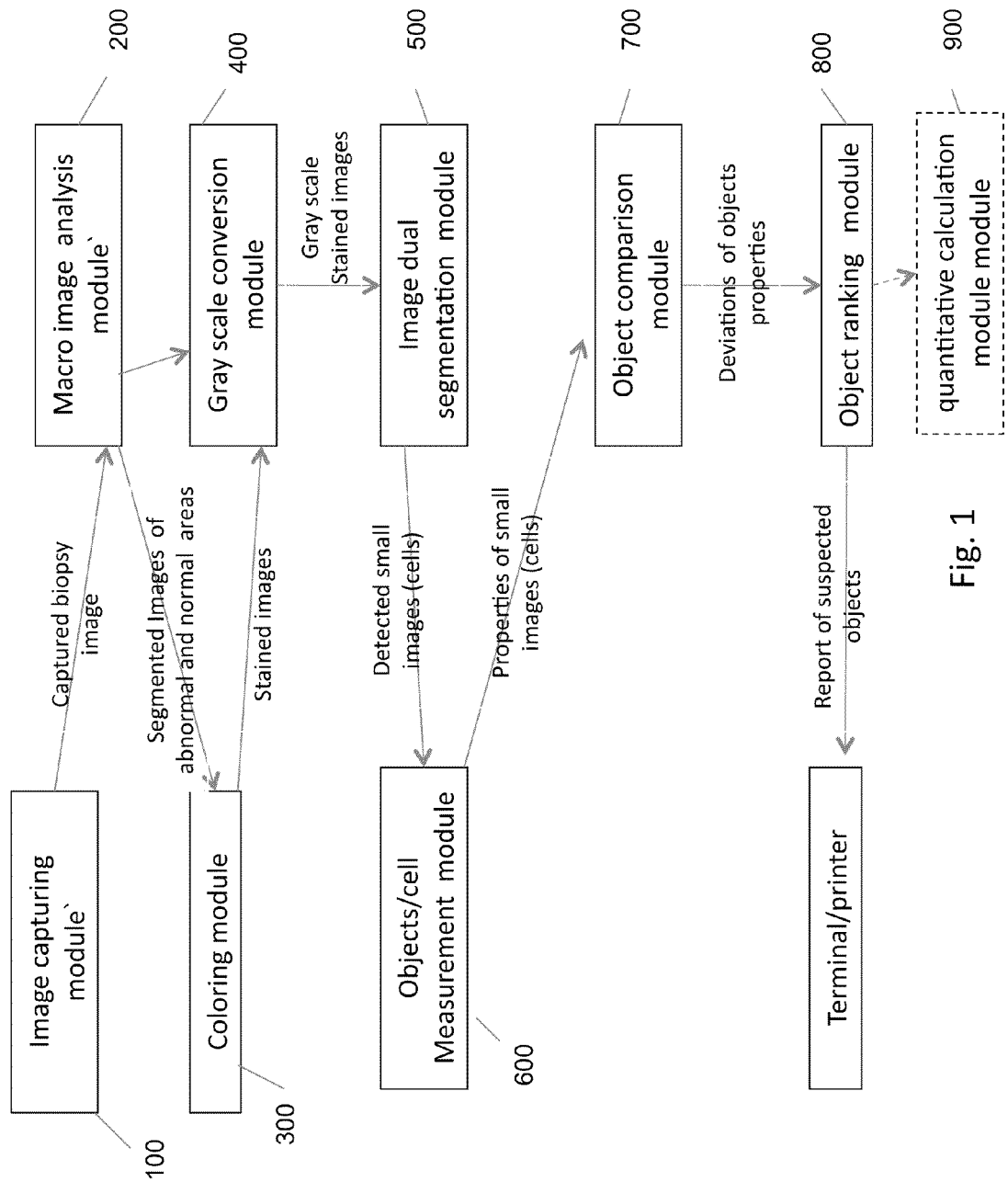
FIG. 1 is block diagram illustrating system components for detecting and identifying pathologies in a magnified captured image according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a method for a semiautomatic procedure of identifying malignant or pathological substances in the captured image of a given biopsy.

FIG. 1 illustrates a block diagram describing the image possessing and analyzing as suggested by the present invention. An image capturing module 100 such as microscope or a mobile camera kit (as will be further described down below) takes a picture of a given biological biopsy which is part of a human organ body. The captured image in conveyed through local or remote communication means to a Macro image analysis module 200. The Macro image analysis module which is implemented on a computerized device performs scanning (automatic or computer prompted manual scan) and analyzing procedures for identifying normal and abnormal segments within biopsy specimen. The captured image is stained by a coloring module which may be implemented by known staining techniques known in the art. As the stained images may be affected by the capturing technique and equipment, it is suggested by the present invention to transformed the image by Gray scale conversion module 400, resulting normalized gray scale images which enable more accurate and successful analysis of the picture. The next step of the image analysis include dual segmentation process preformed by module 500 for detecting small suspected objects/cell with in the image. The detected objects/cells are analyzed by known measuring techniques applied by Objects/cell Measurements module 600 for identifying the properties of each object. Based on the given measurements the Object, a comparison module 700 computes deviations of the suspected objects properties from non suspected objects detected and the normal identified segments. Based on calculated deviations the objects are ranked and indexed indicating the pathological or malignant likelihood of the suspected cells/tissue using the Object ranking module 800. Based on the indexing and ranking reports, biopsy cells may be determined as pathological or malignant using automatic estimation tool or professional human diagnostics.

Figure 2:
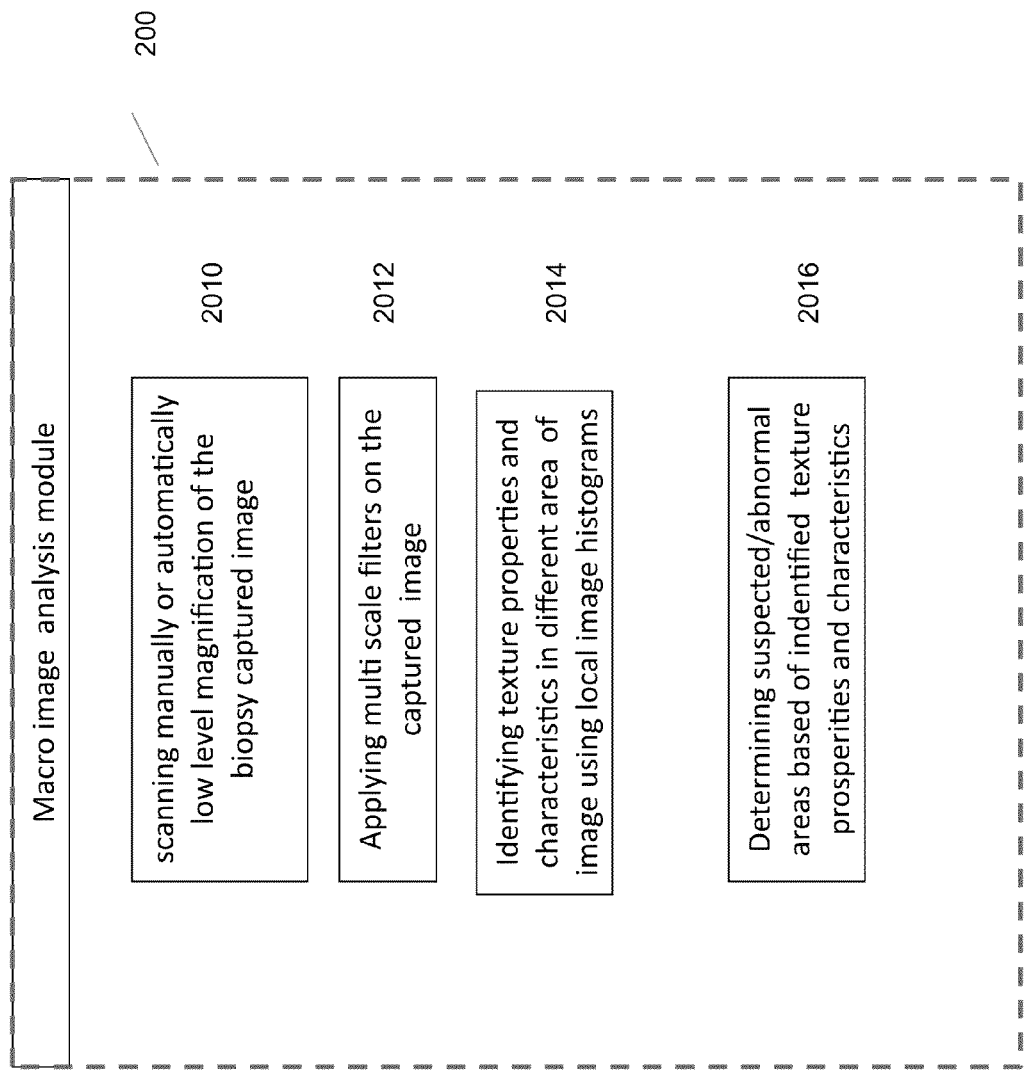
FIG. 2 is flow chart illustration of Macro image analysis module according to some embodiments of the invention.

FIG. 2 illustrates the flow process of the Macro image analysis module according to some embodiments of the present invention.

The macro image analysis, (i.e., segmentation of images under low (×4) magnification/resolution) is intended to identify "suspicious" regions. The term "suspicious" according to the present invention related to different pathological properties like border disruption, irregularity of the cell texture and more.

The given captured image is scanned manually or automatically at low level magnification of the image (step 2010).

Figure 8B:
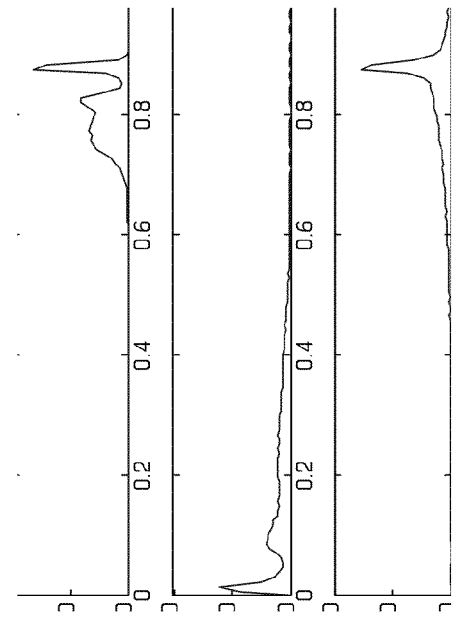
FIGS. 8A, 8B, and 8C demonstrate the macro image analysis results according to some embodiments of the invention.

The macro image analysis may include recognizing different texture patterns and colors accordingly, the analysis implements color and texture features extraction. Since, texture pattern may have a spatial direction the algorithm according to the present invention apply orientable multi-scale filter (banks) (step 2012). Each filter has preferred orientation and scale in the image plane. The result of each filter (DC—zero frequency, elements gives the intensity) is treated as a separate feature Based on image filtering results, each feature is analyzed using local image histograms (see FIG. 8B) (step 2014) for identifying texture properties and characteristics in different area of the images.

At the next step (2016) the suspected/abnormal areas are determined based on indentified texture prosperities and characteristics. For example when the histogram of one or more features exhibits two prominent and well separated peaks—the algorithm, according some embodiments of the present invention identifies this feature as a good feature to make determine pixel segmentation. Since the algorithm uses a number of features it may have multiple segmentations for particular region. This segmentation may be illustrated by colorful diagram (see right FIG. 8C). Each color indicates a different feature, which has good separation ability.

Figure 8C:
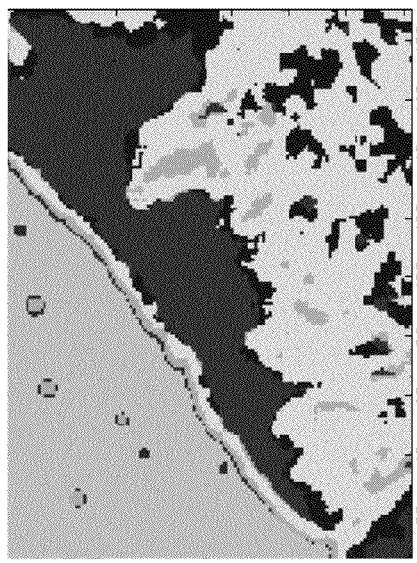
Figure 8A:
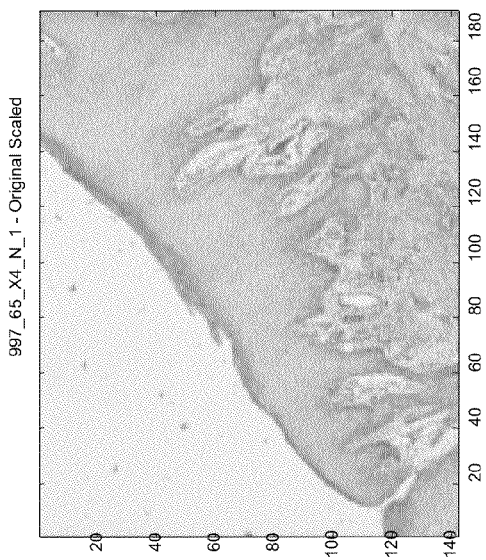

FIG. 8A represents the original macro image and FIG. 8C the segmentation image result based on the macro analysis according to the present invention. This segmented image store much less data information but provides much more clear picture of the segmentation differentiation, which could be more easily interpreted for pathological analysis requirements.

The same process can be repeated in order to fine tune the selection of regions. Regions for higher magnification acquisition can be selected by examining the distribution of the selected color or texture feature within each image region produced by segmentations of the first stage.

According to some embodiments of the present invention, these segmented images can be used to guide a technician to manually sample images of High resolution from each region ("texture") in order to acquire a representative set of images from all the tissues presented in this specific sample.

According to some embodiments of the present invention these segmented images can be used as basis for automated processing stage, sampling from the different Areas of Interest (AOI(.

The transition areas between different "textures" (tissues) can be examined in the algorithm analyzing process to be used for detecting an invasion of suspected "texture" to the adjacent tissue structure, such detection can be interpreted as a more "aggressive" tumor.

This is similar to the way a pathologist traces the basement membrane (the histological structure separating the epithelial layer from the connective tissue) in order to detect the aggressive invasive carcinoma Vs. the less aggressive "in-situ" carcinoma which does not breach beyond that layer.

Measurement of features like "Fractal Dimension" of the border is used according to some embodiments of the present invention to assess and quantify the "aggressiveness" and "invasiveness" of the tumor. A high Fractal Dimension (closer to 2) is an indication of high aggressiveness. The thickness of the "Intermediate" texture is another important feature in the invention.

The process as described above provides advanced diagnosis procedures, supporting manual inspection by human pathologist for viewing the different textures and semi automatic or automatic inspection. In an automatic inspection, a motorized stage, described in the US patent application No. 20040014165 will retrieve the positions in the macro image and acquire images there at high magnification (20× and 40×). This is the automatic data reduction to prepare the slide for either local or remote diagnosis.

Figure 3:
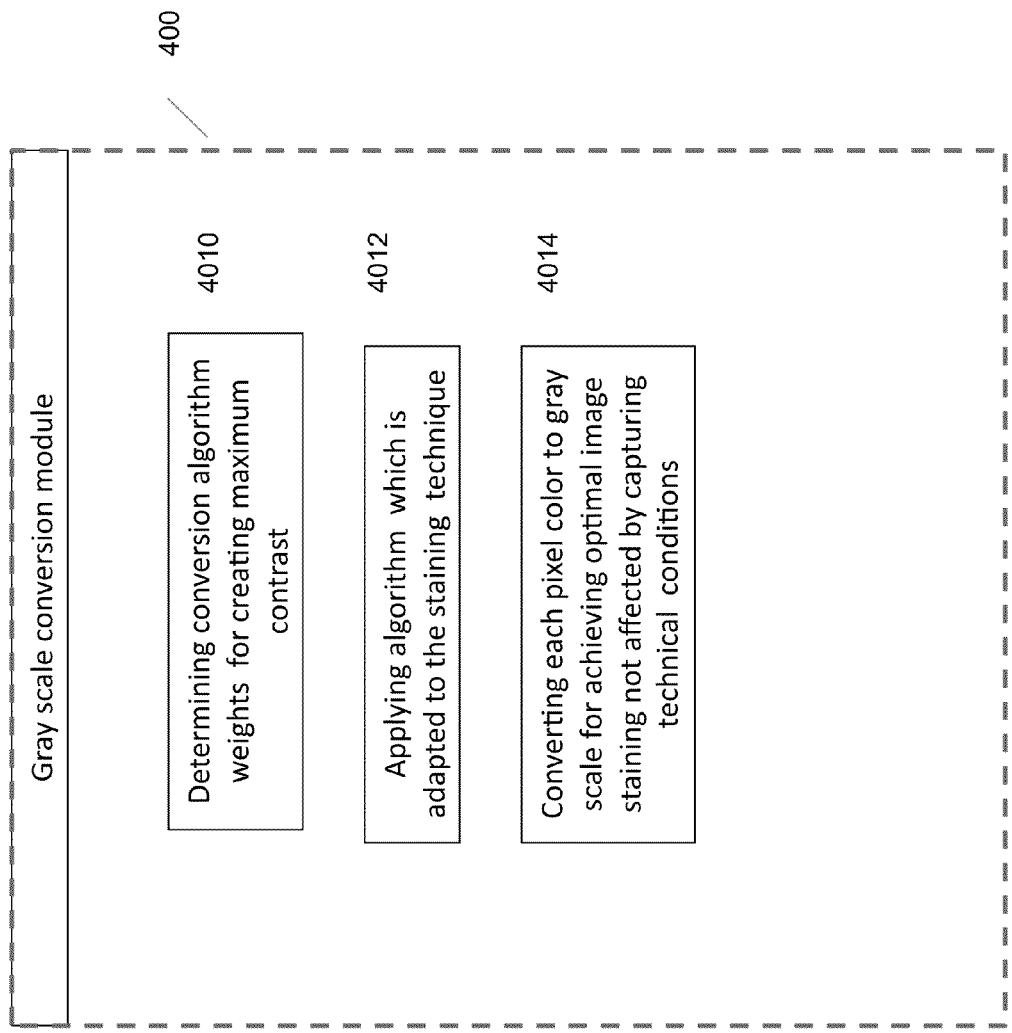
FIG. 3 is a flow chart illustration of the Gray scale conversion module according to some embodiments of the invention.

FIG. 3 illustrates the flow process of the Gray scale conversion module according to some embodiments of the present invention.

The stained image color results which are received by the known coloring techniques may produce different variations of coloring depended on many intervening factors such as: technical conditions (e.g. illumination conditions), equipment type (e.g. microscope) which was used, the day in which the image was produced, the specific pathology labs, the examined tissues, time of embedding, staining and many other intervening factors.

According to the present invention it is suggested to provide an automatic method for transforming the color information into new formation normalizing all side affects described above using optimized memory space and convenient format.

In the first step of the conversion process are determined the conversion algorithm weights for creating maximum contrast (step 4010). Based on the calculated weight the proper algorithm is determined (step 4012) adapted to the used staining technique. The determined algorithm is applied on each pixel of the image converting it to gray scale based on the calculated weights (see step 4014).

Figure 9C:
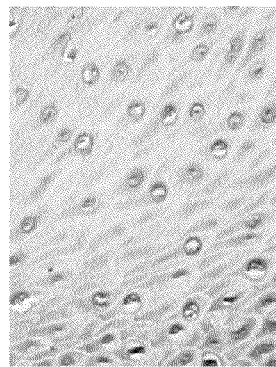
FIGS. 9A, 9B, 9C and 9D demonstrate the gray scale conversion results according to some embodiments of the invention.
Figure 9D:
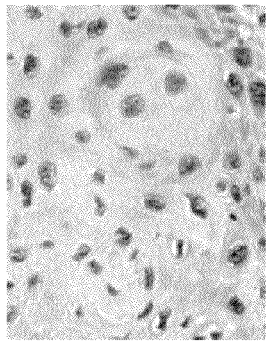
Figure 9A:
Figure 9B:
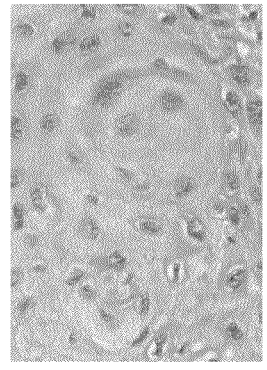

For better explanation we will use the example shown in FIGS. 9A, B, C and D, relating to staining of Hematoxillin & Eosin, which was designed to enable the human eye to separate the different image details.

It is known, that the best possible separation distance is between red and blue wavelength, accordingly, it is suggested by the present invention to perform the following transformation: for each pixel [x,y] with values R[x,y], G[x,y], B[x,y] in each color channel, the following weighted distance is computed:

$$I[x,y]=1.3R[x,y]-0.3B[x,y], \forall x,y: 1 \leq x \leq n, 1 \leq y \leq m$$

The choice of the weights typically (1.3 and −0.3) was determined by the algorithm as the optimal separator for the case of H&E.

In a more generalized form the separation is achieved by to accommodate for different stain techniques:

$$I[x,y]=w_r*R[x,y]+w_g*G[x,y]+w_b*B[x,y]$$

The weights $w_r$, $w_g$ and $w_b$ calculated by this algorithm can support both semi-automatic and automatic options. In the fully automatic option, the modules identify in the color space the weight that will give maximum contrast. The second option of semi automatic process, the user can mark on the image specific structures of nuclei or cytoplasm and the module will calculate the separation weights according to these set of given marks.

The results of the above described example is illustrated in FIGS. 9(A-D): The original color and intensity image I[x,y] are depicted in the FIG. 9A, 9B and the transformed images according to the present invention conversion modules is depicted in FIGS. 9C and 9D.

The transformation process as suggested by the present invention enables to adjust conversion algorithm to be applied for different staining techniques or other images sources (i.e. Gray level): a different separation weight should be used to optimize the final outcome derived either empirically or automatically as explained above:

an automatic conversion enabling to find the best possible separation to identified zone or objects.

Predefined for specific stains (like the H&E on the previous example

Manually by marking on two regions of the image which contain the different relevant data (i.e. cell nuclei and cytoplasm(.

According to some embodiments of the preset invention, the conversion algorithm provides the ability to work with wavelengths which are not visible to the eye, covered by the image sensor, such as UV and near IR. Optionally due to phenomena of the UV absorption of the DNA the algorithm can support interfacing to UV images and performing on them either visual or automatic diagnosis. The same may applies for fluorescent stain.

According to some embodiments of the preset invention, the separation is implemented, in the HIS domain as RGB is not an ideal model for segmenting colors based on color sensing properties of human visual system. Thus the algorithm can use HSI color model for this purpose. In HSI color space, hue (H) and saturation (S) determine the chromatic information while intensity (I) represents the brightness.

Figure 4:
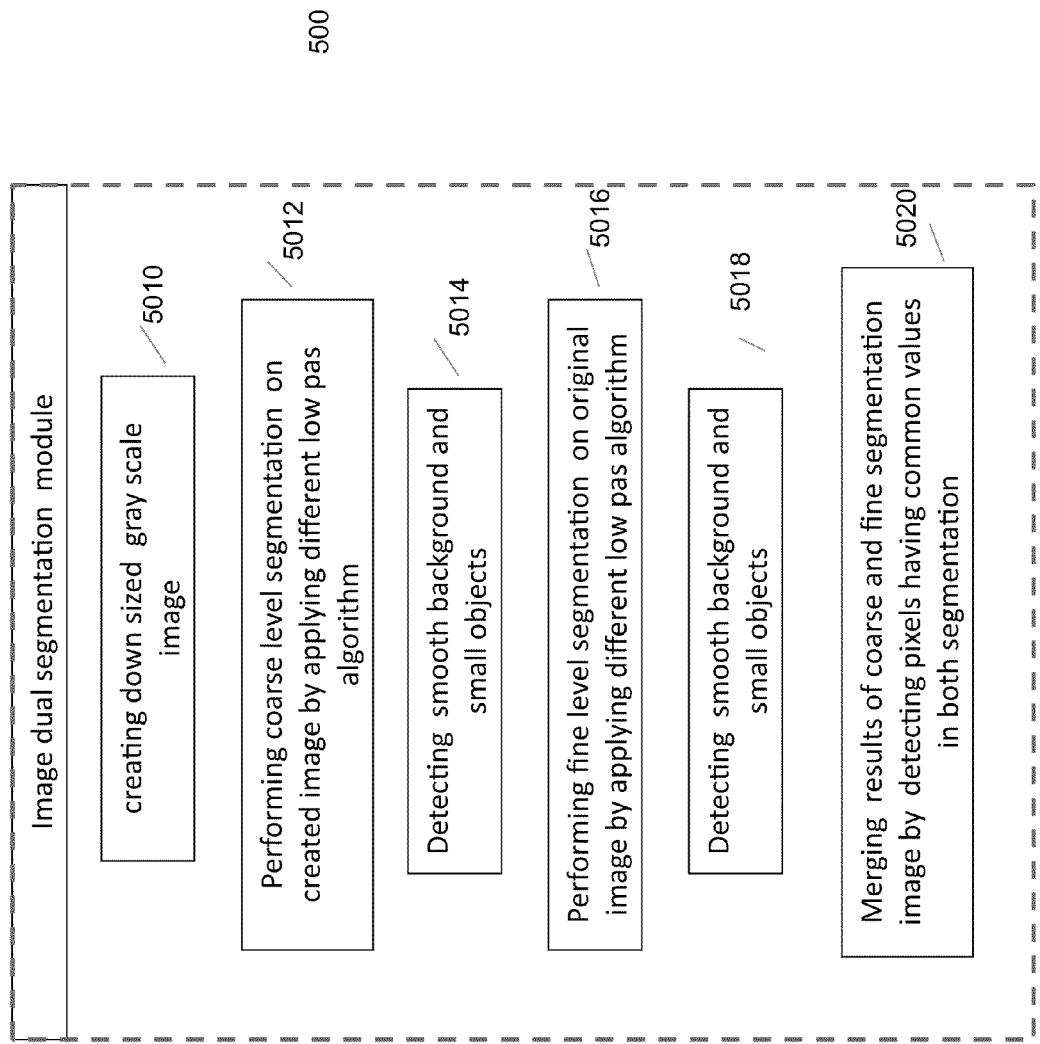
FIG. 4 is a flow chart illustration of the Image dual segmentation module according to some embodiments of the invention.

FIG. 4 illustrates the flow process of the Image dual segmentation module according to some embodiments of the present invention.

The Image dual segmentation module extracts cell structures, based on the gray scale image and shape size assumptions. The module process applies two stages: fine level segmentation and coarse level segmentation procedure. This dual stage process goal is to first identify high confidence cell regions and then improve the cell segmentation results by analyzing the more detailed structure of the image.

Coarse Image Segmentation: At the first stage of the coarse image segmentation the original gray scale image I[x,y] is down sized by a pre-defined factor (step 5010). For example by factor of 3:

At the next step different low pass filters are applied to improve the segmentation process (step 5012). For example:

$$Ic[y, x] = \sum_{i,j} I[i - 3y, j - 3x]LP[i, j]$$

$$\forall\, x, y: 1 \leq x \leq \lfloor n/3 \rfloor\, 1 \leq y \leq \lfloor m/3 \rfloor.$$

where LP[i,j] is a low pass filter with cutoff frequency to prevent aliasing effect.

Then the following segmentation process is performed on the coarse image Ic[x,y] First very smooth ~30 (typically) pixel standard deviation Gaussian filter is applied to find a smooth background image Ib[x,y] and then another Gaussian filter with standard deviation of 7 pixels typically is applied to detect small objects Io[x,y]. It acts like a matching filter for dark cells. The typical values are set based on the magnification micron/pixel and the ratio to the cell size.

After applying the low pass filters, smooth background and small objects are differentiated (step 5014): The difference between Background and Object filtered images Id[x,y]=Ib[x,y]−Io[x,y] is compared to the threshold computed by image threshold using Otsu's method (http://en.wikipedia.org/wiki/Otsu's_method), which chooses the threshold to minimize the interclass variance of the thresholded black and white pixels. The result of the thresholding is a segmented image Is[x,y] at coarse level.

At the last step, the segmented image Is[x,y] is up-sampled back to the original size Ics[x,y] increasing black and white objects accordingly. The anti aliasing filter smears black and white boundaries. The algorithm recovers % information by additional threshold comparison with 0.5.

Fine Image Segmentation: The same produces as described above is applied on the original size gray scale image I[x,y] for the fine level segmentation: Detecting smooth background and small objects (step 5016) and Detecting smooth background and small objects (step 5018).

For example: Gaussian filter with ~10 pixel typically standard deviation is applied to find a smooth background image Ib[x,y] and then another Gaussian filter with standard deviation of 2 pixels typically is applied to detect small objects Io[x,y].

The typical values are set based on the magnification micron/pixel and the ratio to the cell size.

The difference between Background and Object filtered images Id[x,y]=Ib[x,y]−Io[x,y] is compared to the threshold computed by image threshold using Otsu's method.

The resulting segmentation image Ifs[x,y] of the fine level contain smaller size black and white objects marked by 1 and 0.

The final step of the dual segmentation is the merging of Coarse and Fine Segmentation Information (step 5020).

The coarse level segmentation describes objects that have prominent dark color with suitable size, matching the common cell structure. This information has more confidence than fine level information.

The merging process is performed by detecting pixels having common values in both segmentation levels: The image Ics[x,y] (of the coarse level) is dilated (expanded) by disk of size 9 pixels and this information is overlaid against fine segmented image Ifs[x,y] (of the fine level). The pixels where both dilated and fine images which have value one are added to the coarse image Ics[x,y] as fine structure elements.

Figure 10C:
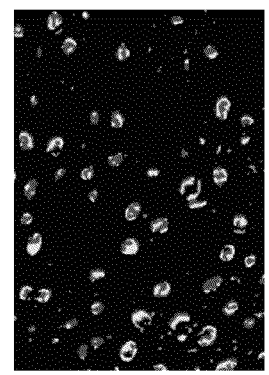
FIGS. 10A, 10B, 10C and 10D demonstrate dual segmentation process results according to some embodiments of the invention.
Figure 10D:
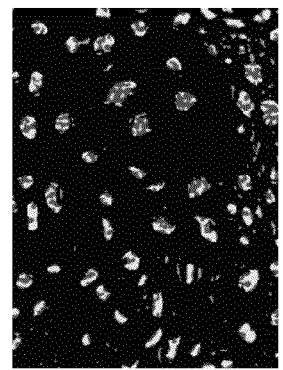
Figure 10A:
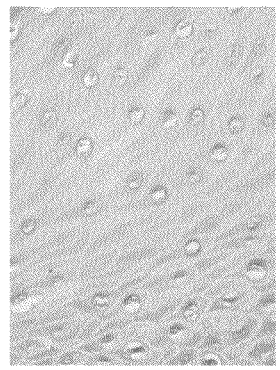
Figure 10B:
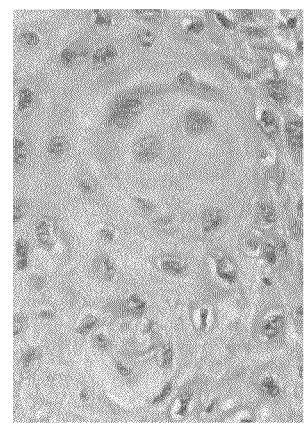

FIGS. 10A and 10B are original images, FIGS. 10C and 10D demonstrate the result of the segmentation process: Red color designates coarse segmentation results, Green color is fine segmentation and Yellow are regions where Fine segmentation is added to expanded Coarse segmentation.

Figure 5:
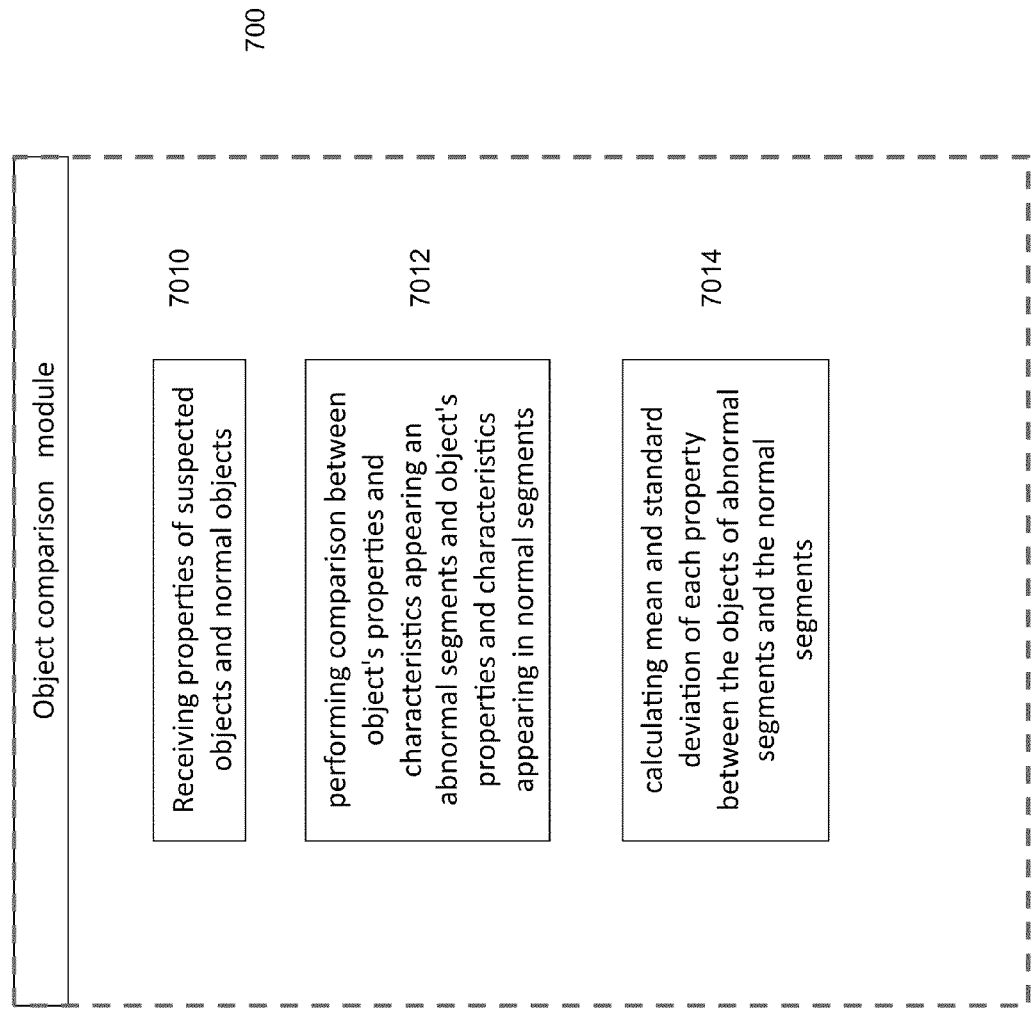
FIG. 5 is a flow chart illustration of Object comparison module according to some embodiments of the invention.

FIG. 5 illustrates the flow process of the Object comparison module according to some embodiments of the present invention.

According to the present invention its is suggested to use for each patient two image data: One image data represent a normal objects/cells, taken from the normal area as detected in the Macro image analysis and abnormal objects, which is taken from a suspicious area (step 7010).

For analyzing the suspected objects it is suggested to perform comparison between object's properties and characteristics appearing an abnormal segments and object's properties and characteristics appearing in normal segments (step 7012): The comparison can be implemented using the following algorithm:

Let P[k]={p1[k], p2[k], . . . , pd[k]} be a d-dimensional vector of all the parameters (shape and color) measured for each cell k. Let L[k]∈{N,S}—be a label that designates if cell k comes from normal or suspected image. The algorithm computes mean and standard deviation for each parameter separately for normal and separately for suspected:

$$m_i^r = \frac{\sum_{k=1}^{K} p_i[k]\delta(L[k] = r)}{\sum_{k=1}^{K} \delta(L[k] = r)},$$

$$\sigma_i^r = \frac{\left(\sum_{k=1}^{K} (p_i[k] - m_i^r)^2 \delta(L[k] = r)\right)^{1/2}}{\sum_{k=1}^{K} \delta(L[k] = r)},$$

$$r \in \{N, S\},\ 1 \leq i \leq d$$

where K is a total number of cells in specific patient data and $\delta(.)\in\{0,1\}$ is the set indicator function. The computed moments $m_i^N$, $\sigma_i^N$, $m_i^S$, $\sigma_i^S$ describe the averaged statistics for all the cell parameters. It is expected that normal and suspicious statistics be different and that difference is captured by first and second moments. The algorithm thus defines the true feature vector F[m]={f1[m], f2[m], . . . , f2d[m]} for patient image data m (m-defines a specific patient set of normal and suspected images) as $$F[m] =$$

$$\left\{ \log\left|\frac{m_1^S}{m_1^N}\right|, \log\left|\frac{m_2^S}{m_2^N}\right|, \ldots, \log\left|\frac{m_d^S}{m_d^N}\right|, \log\left|\frac{\sigma_1^S}{\sigma_1^N}\right|, \log\left|\frac{\sigma_2^S}{\sigma_2^N}\right|, \ldots, \log\left|\frac{\sigma_d^S}{\sigma_d^N}\right| \right\}$$

(Where absolute is used for precautions since most of the features are positive).

When a feature fi[m] significantly differs from 1 it indicates the significant difference between normal and sick/suspected images. This feature definition supports the invariance requirements.

This algorithm enables to calculate mean and standard deviation of each property between the objects of abnormal segments and the normal segments (step 7014).

Figure 6:
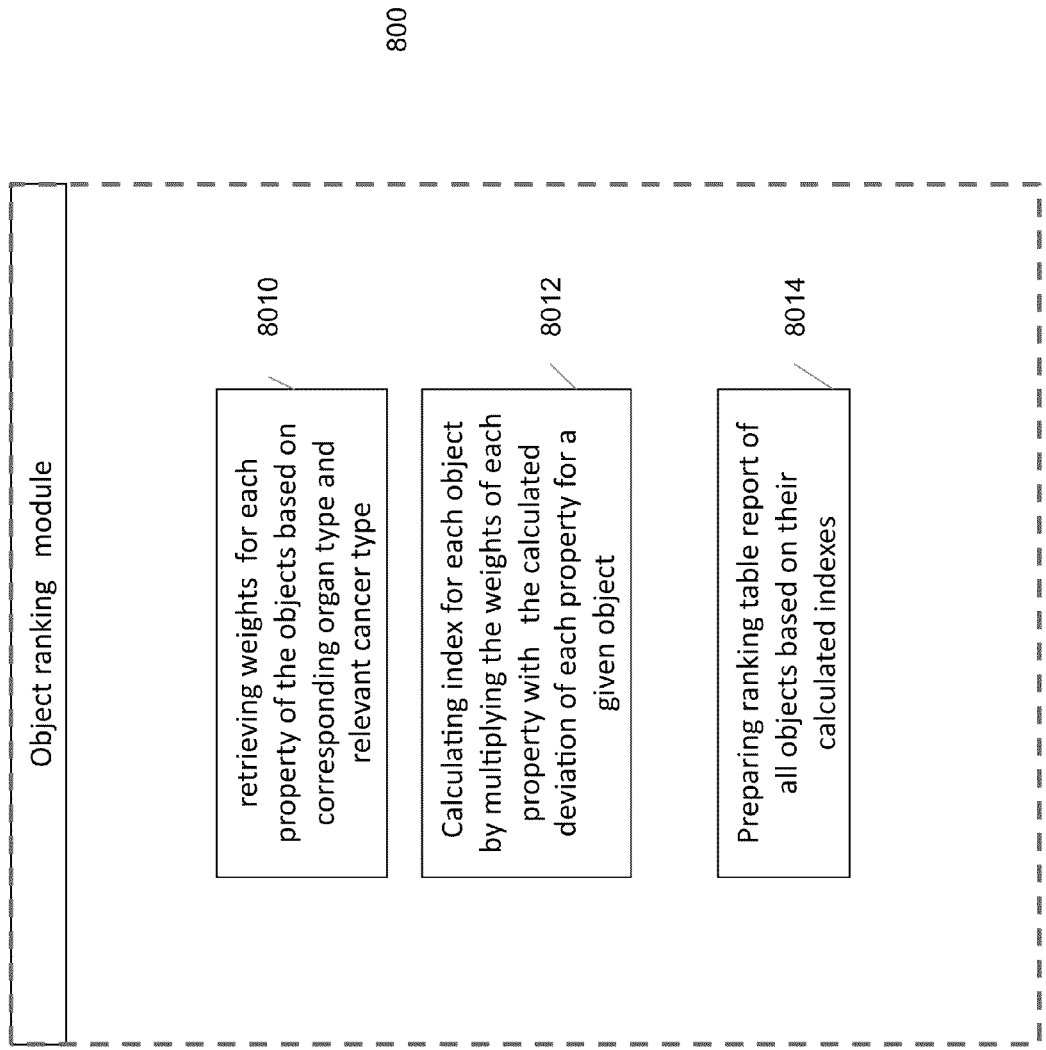
FIG. 6 is a flow chart illustration of Object ranking module according to some embodiments of the invention.

FIG. 6 illustrates the flow process of the object ranking module according to some embodiments of the present invention.

At the first stage of the process are retrieved weights for each property of the objects based on corresponding organ type and relevant cancer type (step 8012). The weights are calculated on the historical statistics of cancer diagnostics.

Based on these weights is calculated an index for each object by multiplying the weights of each property with the calculated deviation of each property for a given object (step 8014)

Preparing ranking table report of all objects based on their calculated indexes (step 8016).

Figure 13:
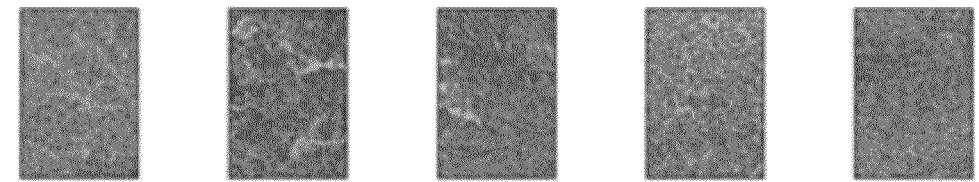
FIG. 13 shows an example report of ranked images objects in accordance with some embodiments of the invention.

FIG. 13 show an example report of ranked images objects in accordance with ranking methods suggested by the present invention. The image refers to lymph tissue as further explained in this invention but the presentation concept is similar with Malignancy Index replacing Metastasis Index.

In tests conducted by the inventors, the classification which is based on known, well developed methods like SVM algorithm, K-Nearest Neighborhood, as described in the previous invention, did not always give reliable results. Partially, it is explained by specific type of normal and lesion feature data used and partially because of high complexity and size of the dataset (The present algorithm is aimed to overcome this gap. It is performed at the initial stage of the classification process, an early stage where it is not required from the classification algorithm to offer a decision about a specific image set.)

According to some embodiments of the present invention the index creation is performed by the following algorithm: the probability (or "Distance") of being not normal is calculated as a first indicator. Therefore, malignancy index or abnormality of patient data m is defined in the algorithm of the present invention by $$MI[m] = \sum_{i=1}^{2d} w_i |f_i[m]|,$$

$$w_i \in [0, 1], \sum_{i=1}^{2d} w_i = 1$$

The choice of weights $w_i$ is of primary importance and defined by the SVM engine described in the US patent application No 20040014165 or by Fuzzy logic ranking of known heuristic human pathologist knowledge translated to classification algorithms and weighted by FL.

It regulates the importance of each feature. The setting of weights is done for a specific type of cancer. It is not expected that the weight will vary much for other types of cancer.

If malignancy index MI[m] is close to zero it means that suspected image is normal. The deviation from zero increases the probability of being abnormal.

The malignancy index defined above does not contain the second order feature interaction information. It could be fixed by defining another feature (for example a combined feature such as cell size and internal cell color variability product), which is derived from already available information. This way is much more effective to maintain a low dimensional feature space compared to methods with nonlinear kernels (http://en.wikipedia.org/wiki/Support_vector_machine).

Having the new algorithm executed initially gives a lot of clarity for the second stage of actual classification as described in the previous invention.

Figure 5A:
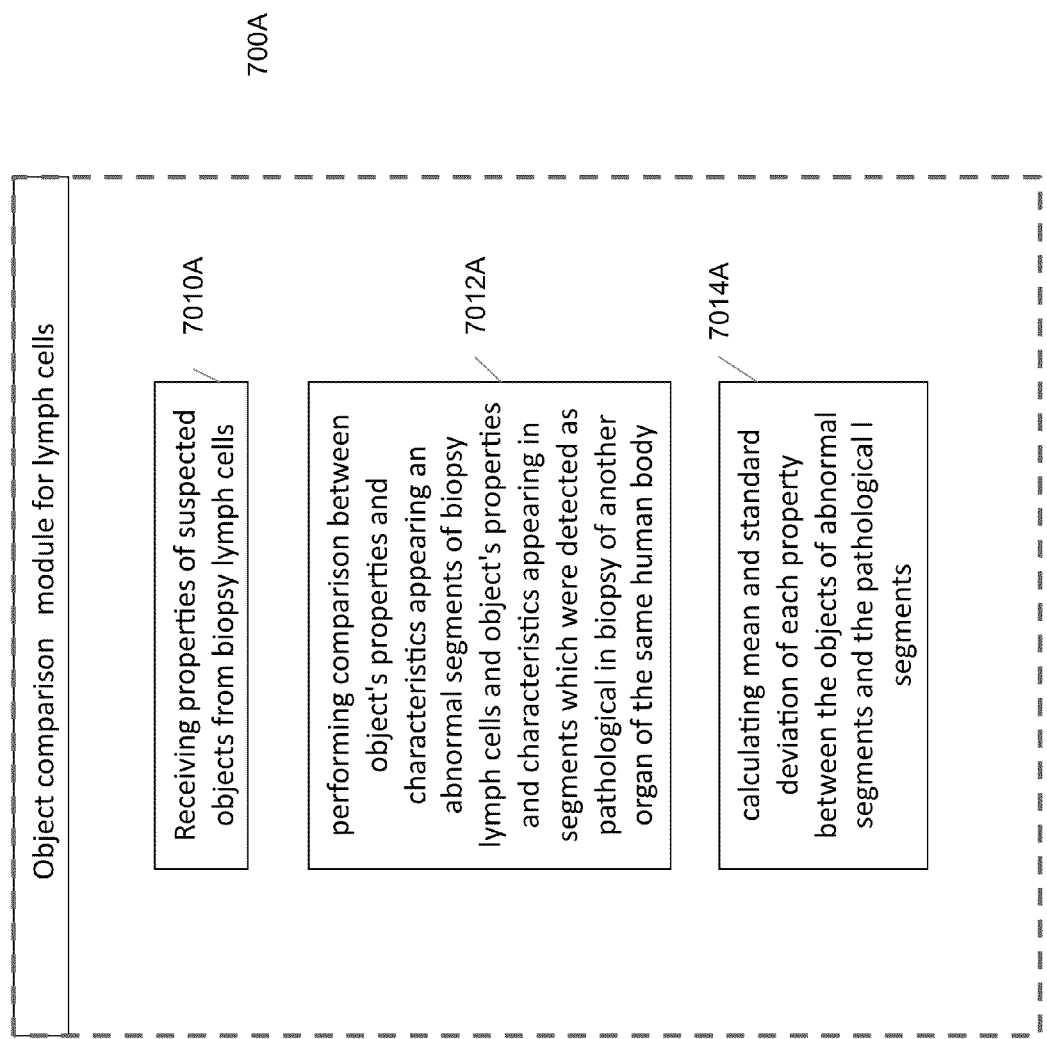
FIG. 5A is a flow chart illustration of Object comparison module for lymph cells according to some embodiments of the invention.

FIG. 5A illustrates the flow process of the Object comparison module for lymph cells according to some embodiments of the present invention.

A pathologist is required to identify metastases infiltrated from the original tumor to the Lymph nodes. The tumor may appear in small cluster of cells (sometimes not more than a dozen or two) "hiding" inside the vast cell population of the lymph gland (sometimes refers to as "Micro metastases"). Today the human pathologist has to scan manually dozens—sometimes more—serial sections from the same lymph nodule. Such scan cannot guarantee that a tumor does not exist in the Lymph nodes.

The process as suggested according to the present invention is based on the following assumption: Lymphocyte cell population is very uniform in shape and size—even between different people and the metastases features are similar to their tumor origin According to the present invention it is suggested to acquire the properties of suspected objects from biopsy lymph cells (step 7010A) in equivalent process described above for any given biopsy, including "Gray Level Conversion" and "Dual Segmentation" described above.

The acquired images are processed using conventional feature extraction techniques for identifying the (uniform) lymphocytes. The identified lymphocytes are deleted from the image.

At this stage of the algorithm the pathologist is provided with a processed image having only the "Non Lymphocytes" cells containing less "noisy" information, hence supporting the pathologist ability to easily diagnose and identify the "suspicious" cells.

According to the present invention an equivalent procedure as described above can be implemented on other organ images which contains inflammation objects other than lymphocytes. Eliminating inflammation objects from the image, provide a "cleaner" image, enabling to identify other immune system cells providing enhanced image of the relevant tissue/cellular structures.

For analyzing the suspected objects it is suggested to perform a comparison between object's properties and characteristics appearing in abnormal segments of biopsy lymph cells and object's properties and characteristics appearing in segments which were detected as pathological in biopsy of another organ of the same human body (step 7012A).

Based on these comparisons are calculated mean and standard deviation of each property between the objects of abnormal segments and the pathological segments (step 7014A)

Based on the comparison the objects are ranked according to the procedure described above for other organ cell providing a "Metastases index" that can be used to grade the lymph images by their "similarity" to their original tumor.

The original and processed images are presented to the pathologist providing him with the most "suspicious" ones according to the calculated index, accordingly the pathologist will screen only the first few images which are the most likely to contain metastases and not hundreds of the source images, hence saving significant time and effort.

Figure 11C:
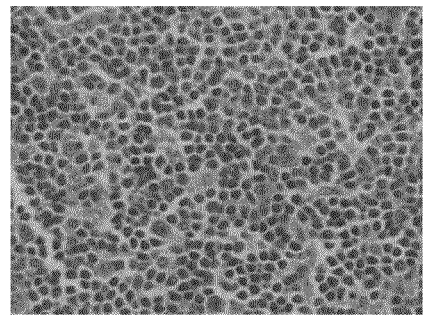
FIGS. 11A, 11B, and 11C demonstrate the Lymph tissue analysis results according to some embodiments of the invention.
Figure 11B:
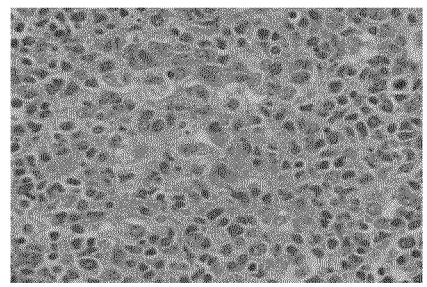
Figure 11A:
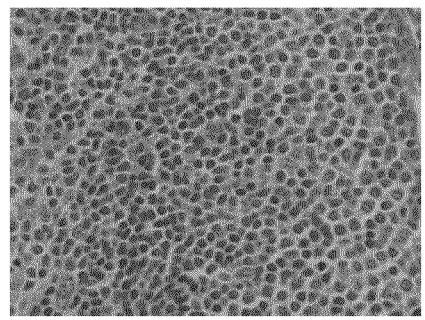

According to some embodiments of the present invention, in case where the original tumor is not available for the comparison procedure, it is suggested to use the same technique as described above (in epithelia biopsies) comparing the suspicious objects against objects in a Normal Lymph tissue and grading the images by their "distance" from the normal appearance. The "normal" features can be derived from a predefined Normal Lymph field, or, by using the Normal cell population deleted at the "cleaning" process of the algorithm—these can act as an internal control group for normalization of data and feature distribution for every image in the set separately. FIG. 11A Show Normal Lymph tissue, FIG. 11B shows an Original Tumor and FIG. 11C show tumor cells infiltrating the Lymph node.

Figure 12C:
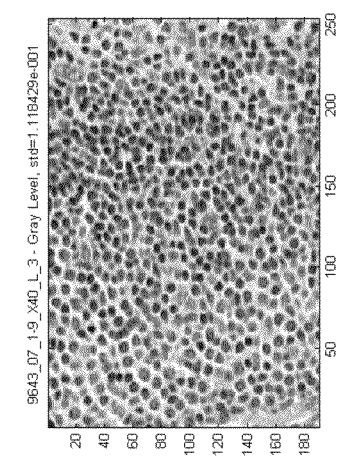
FIGS. 12A, 12B, 12C and 12D demonstrate the Lymph tissue analysis results according to some embodiments of the invention.
Figure 12D:
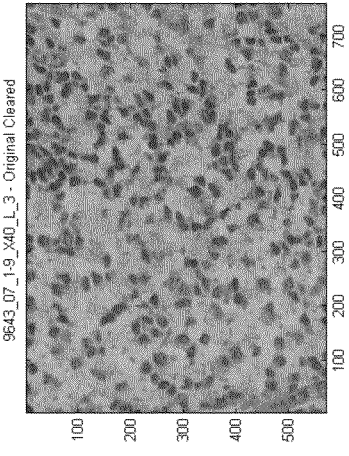
Figure 12A:
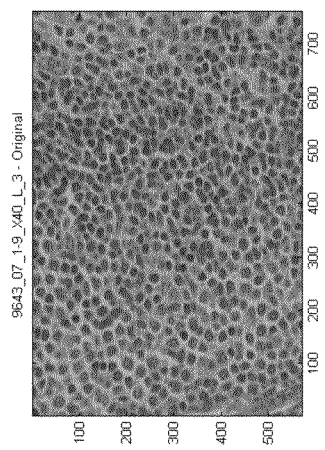
Figure 12B:
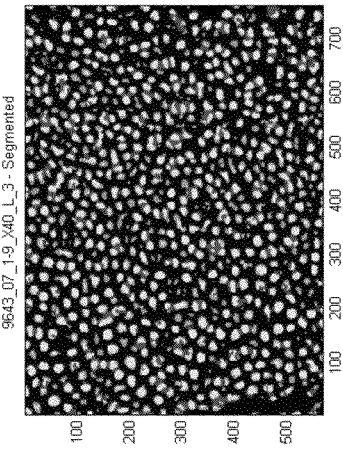

FIG. 12A shows the original image, FIG. 12c shows Gray Level image, FIG. 12B Dual Segmentation result and FIG. 12D shows the Processed Image.

Figure 7:
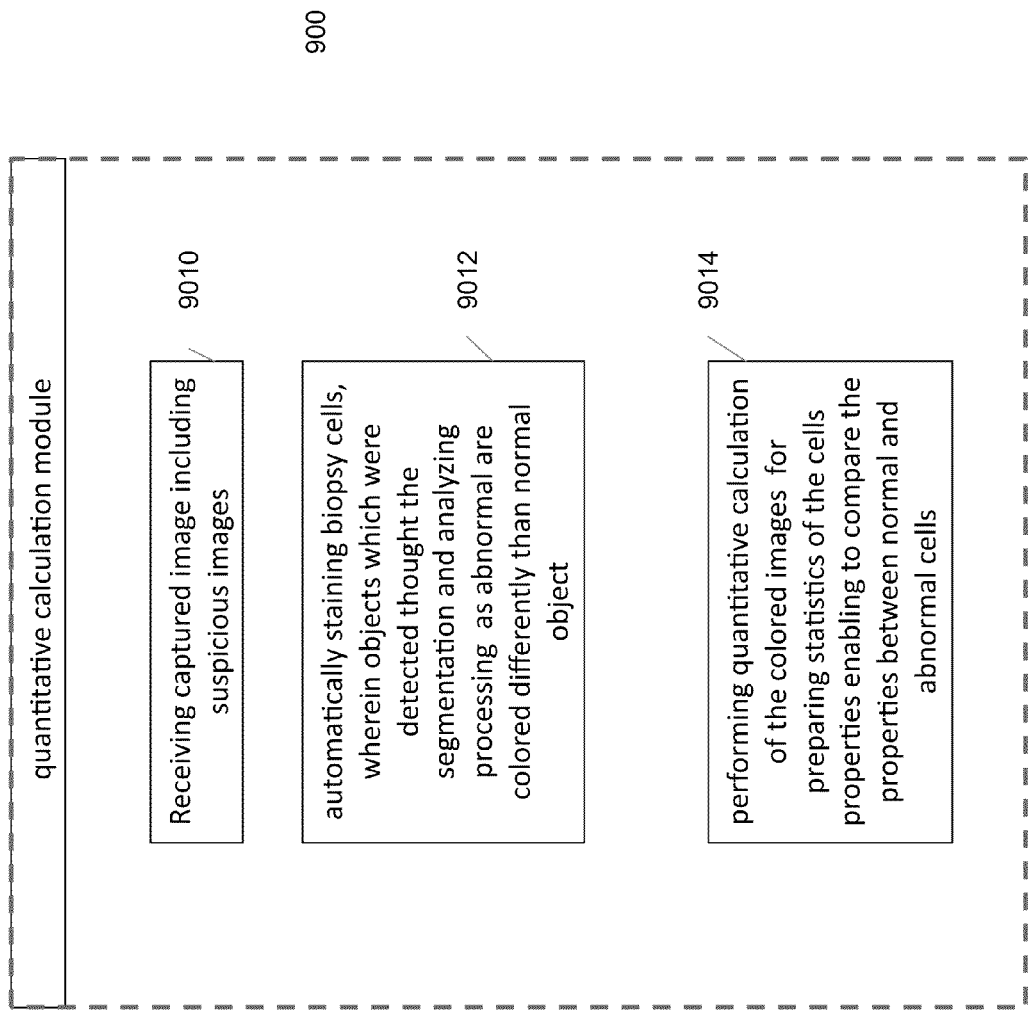
FIG. 7 is a flow chart illustration of quantitative calculation module according to some embodiments of the invention.

FIG. 7 illustrates the flow process of quantitative calculation module according to some embodiments of the present invention.

The known methods of specific staining were developed, introducing new, specific stains, to identify tumor specific peptides or other cellular signals, these methods which are already commercially available kits are designed to mark the targeted cells/structures in a specific dye over the background color of the surrounding tissue.

According to some embodiments of the present invention it is suggested to provide a tool that will enable the pathologist to quantify and measure these specific signals. The images undergo "Gray Level Transformation" to the color space optimized for that specific staining as previously explained.

Based on received captured image including suspicious images (step 9010), the biopsy cells are automatically stained in the digitized and the displayed image, wherein objects which were detected through the segmentation and analyzing processing as abnormal are colored differently than normal object; (step 9012)

Based on the new stained image the module performs quantitative calculation of the colored images for preparing statistics of the cells properties enabling to compare the properties between normal and abnormal cells; (step 9014)

The process can be designed to do it automatically (looking for the best separation colors), optionally based on Pre-defined colors (for known dyes) or manually by pointing on the Targeted color and the background stain by a human operator.

After the image is segmented using the "Two stage Segmentation", the cell nuclei are identified, a separate segmentation is made to define the "special" dye.

The cell population is then separated to cells that are marked (the Nuclei "touch" the special dye regions) and un-marked cells.

Feature Statistics and ratios between these two populations (i.e. number of cells, stained areas, nuclei size, nuclei/cytoplasm ratio etc.) are calculated and sent to the clipboard as a text table, or saved as common data formats (such as .xml).

This part of the algorithm addresses the developing field of advanced staining and offer a tool to adapt the diagnosis system to these new stains, benefiting from the rest of the tools described in this patent and the previous one.

An extension to this part of the invention benefits from the development of novel stains with affinity to cancer cells. The invention proposes a fast and quantitative tool, to detect the presence of malignant cells by analyzing the color components of a global camera field of view. This global analysis is faster than analyzing the morphometry of discrete cells. Compared to a human observer doing this color quantification, the proposed invention offers a quantitative scale on the amount of the relevant color components in the field of view. An example of such stain is CellDetect™ by Zetiq® technologies as demonstrated in FIG. 15 below.

Figure 14C:
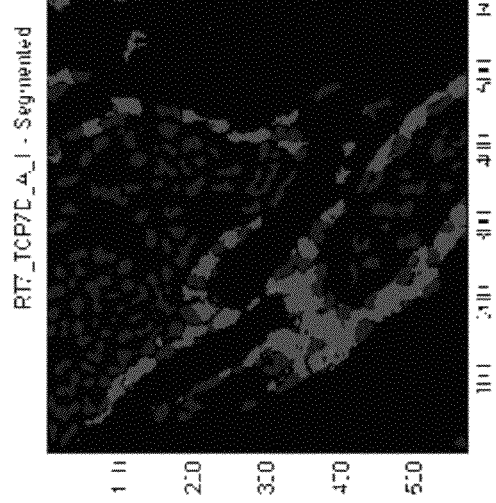
Figure 14D:
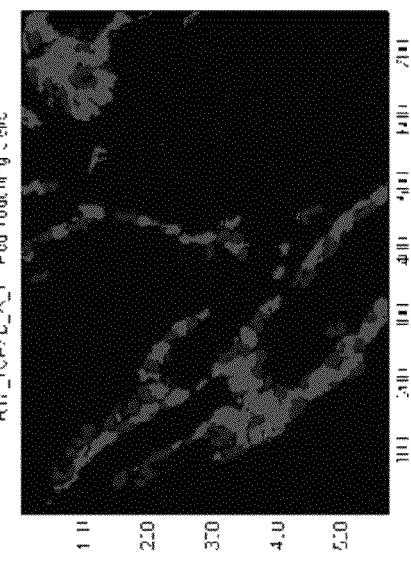

FIG. 14A Showing original image with specific in-situ hybridization Stain, FIG. 14B is Gray Level Conversion Image, FIG. 14C show Dual Segmentation results image RED-Nuclei BLUE: Cytoplasm (bottom left), Marked Cells only (bottom right). FIG. 14D shows the result after filtration of background cells.

Figure 15A:
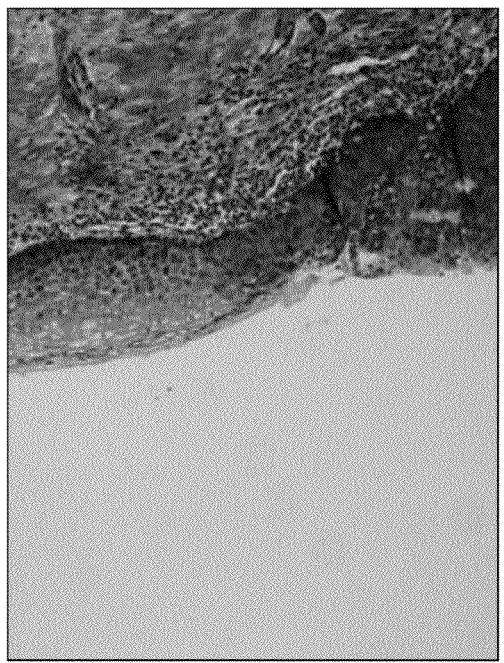
FIGS. 15A, 15B, 15C and 15D demonstrate the quantitative calculation results according to some embodiments of the invention.
Figure 15B:
Figure 15C:
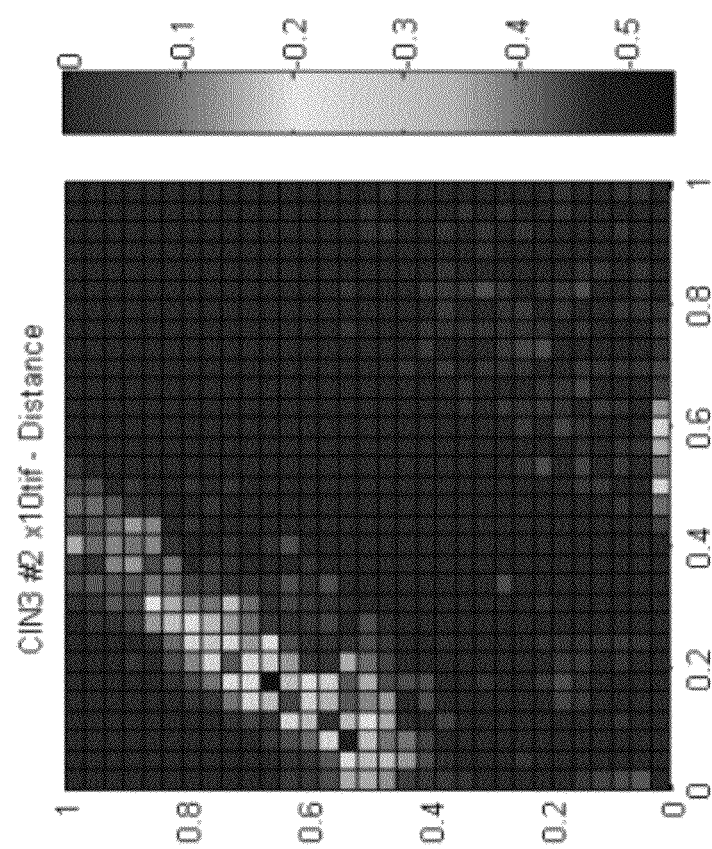
Figure 15D:
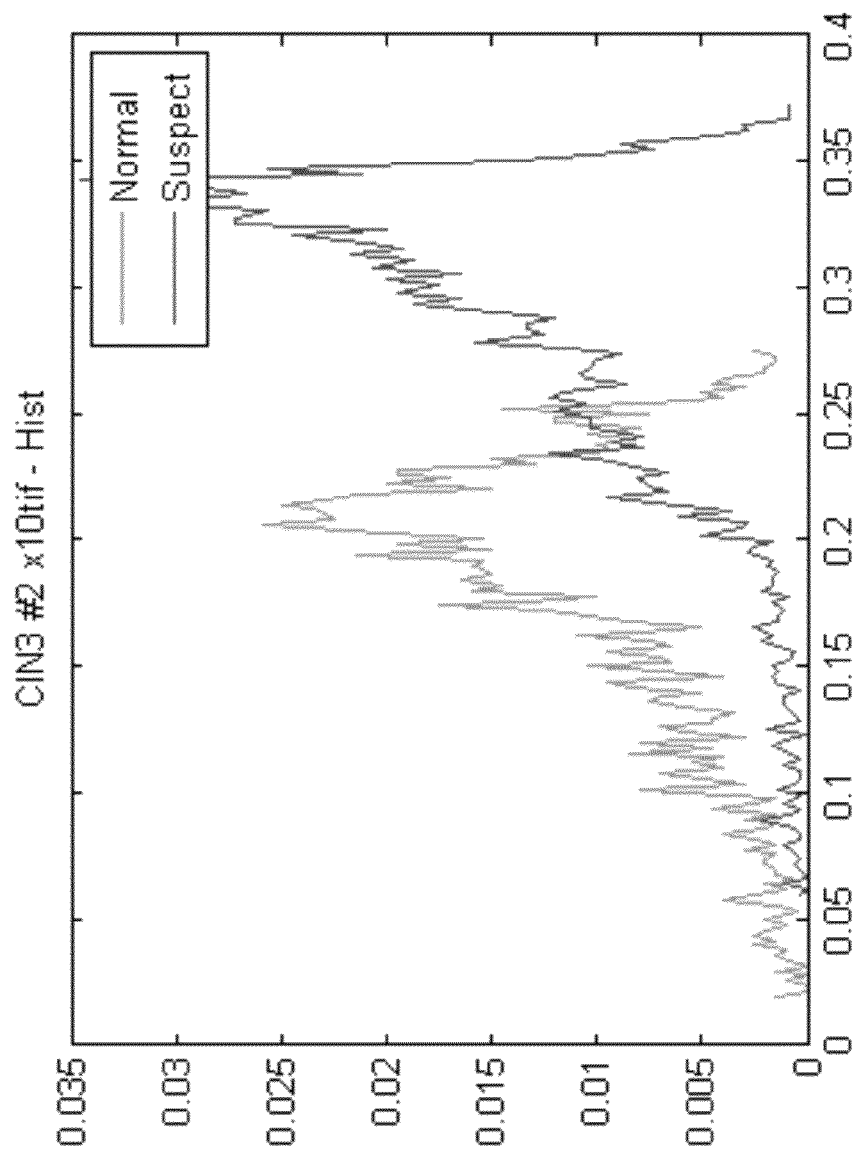

FIG. 15A Showing stained tissue, FIG. 15B shows results image having separation to its color components by de-convolution, FIG. 15C shows an image where the classification is based on affinity ratio to different color component, FIG. 15D shows the image of the whole batch result which is presented as normal vs. suspicious.

The invention also describes a fast and quantitative method for detection of suspected (such as malignant) cells by global color analysis of full camera field of view and quantifying color feature and color composition The present invention may be implement in different network configuration environments, sometime the image based diagnosis should be performed in the field, remote from a microscope and computer and lab environment. For Example: analyzing blood samples for parasites or Malaria or analysis of water reservoirs for contamination and more.

The capturing module for the present invention may be a portable microscopy implementing integration of: High Resolution CMOS sensor, Advanced proximity LED illumination, Cellular phone platform for image transfer via MMS, WiMax or other communication terminal and designated web site where the images are analyzed and a report is sent back by SMS According to some embodiments of the present invention part of the processing of image capturing is performed on a local terminal and the analysis/diagnosis part, is implemented in the remote server.

Figure 16:
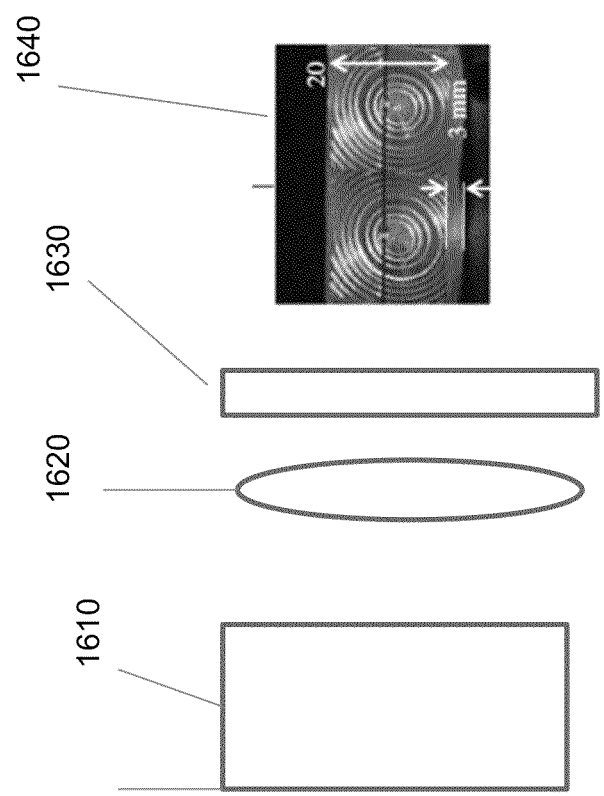
FIG. 16 illustrates an implementation using a cellular phone, having a high resolution camera module which is adapted to capture high quality images of biopsy placed on test slide.

FIG. 16 illustrates an implementation using a cellular phone 1610, having a high resolution camera module which is adapted to capture high quality images of biopsy placed on test slide 1616. The image capture configuration includes a flat array of white LED array 1618, such as manufactured by Philips or Fiat CRF, an interface magnifying lens, 1612 and an optional scanning mechanism where the slide can move perpendicular to the optical axis in order to acquire images of different sections of the slide. The whole device is interfaced to the phone by mounting to the phone and having a structure complementary to the structure of the phone body to assure fixation and easy removal. The slide is illuminated by the LED array and its image is magnified and imaged again through the phone lens, onto the CMOS imaging sensor, where the image is captured, digitized and can be transferred via MMS to a predefined site. The lens is designed to project an image to the infinity so the phone lens can accurately image it onto the CMOS sensor.

Other capturing configuration may have two implementation: 1) A general purpose phone, providing attachment accessories of lens, slide and LED which are used whenever a microscope quality image is to be required. The unit is configured that the LED array can get power via the phone connector. In this configuration the fixation panel has several complementary shapes compatible to different types of phones. 2) A dedicated microscope phone such that the imaging optics of the phone is designed for microscope image requirements.

According to another embodiment of the present invention, the light source is not part of the configuration and the illumination is by an external strong light source. The optical design in the invention has to qualify the following criteria:

The CMOS camera sensor has a pixel of 1.8 micron (Omnivision or Micron sensors for example). The analysis according to the algorithm requires a minimal objective of 20× with a NA of 0.25. The corresponding diffraction resolution is $\lambda/2NA$, where $\lambda$ is the wavelength of the illuminating light. Assuming $\lambda=0.5$ micron, we get the diffraction resolution of a conventional microscope performing the inspection to be 1 micron. The geometrical resolution should be at least 3-5 times better, namely 0.2-0.3 micron. Thus the effective magnification of the proposed optical system of the invention is ×6-×10. It is important to note that the pixel size in the CMOS decreases as the technology progresses. Pixels of 1.4 micron are already commercially available (Sony). This reduces the required magnification in the invention and relaxes the positioning tolerances.

A typical Cell Phone lens has a focal length of 4 mm with F/# of 2.8. The effective aperture is thus 1.5 mm. Using a 8 mm objective lens with high NA in front of the phone camera is proposed, where the slide is not put in the focus but rather in such a distance that an image is generated at a distance of typically 80 mm (magnification close to ×10). This converging beam is focused through the opening aperture of the Cell Phone lens to generate a magnified image, with a resolution according to the NA of the input lens According to some embodiment of the present invention the diagnosis system is distributed in remote processing unit: A biopsy, may be inspected under a microscope, by a client at the pathology lab. The system algorithms, described in US patent application No. 20040014165 disclose extraction of a minimal set of images (typically 6) and sending these images over a communication channel, to a remote server where the images are stored in a Database. The analysis algorithms, described in the patent application No. 20040014165, are applied on the computer remote server for analysis. The report of the analysis is sent back to the remote client using communication data network. The multiple images arriving at the server are also used for fine tuning of the classification algorithms where the classification results can be confronted with experts and in case of discrepancy, the algorithms can be fine tuned.

The communication means data network configuration is adapted to the distance between the remote client and the server.
1. When located at the same facility, it could be via the LAN so several clients can join a centralized diagnosis service.
2. When the server is not at the same premises, the communication back and force is via the internet. It is assumed that the server will receive multiple images and hence would require a wide downstream BW, typically 10 MB per biopsy. On the other hand, the server is sending upstream reports, which require much lower BW. This is a practical aspect of the invention as downstream BW is always much larger than the upstream one.
3. In case of a very remote lab or even a field test as described in FIG. 16, the communication to the server, could be via wireless transfer of images as MMS or other coding. The report will be then be sent by SMS.

According to some embodiments of the present invention the system software will include few basic image analysis tools that are designed in order to supply the pathologist with the image information relevant to pathology, the information will include:

1) Tissue thickness/Tumor size/Lesion penetration: Using the "Macro Analysis" procedure described above—the different tissue regions will be identified. Their thickness & coverage percentage from the whole field will be automatically measured as well as the Size (diameter and Area) of the suspicious lesion.
   The depth of the lesion and how far it penetrates into the tissue can also be assessed using this tool.
2) Using the "Dual segmentation technique" described above—the cells are separated and their Number, Size (Area) and density are measured.
3) The ratio between Nuclei area and cytoplasm are measured and the Nuclei/Cytoplast Ratio are measured.

Image validation processing: In order to assure valid images it is suggested to check every image for:
  Image size/Resolution
    Typically Min [100×100]/Max [2000×2000] image size
  The image must contain color information—(i.e.—RGB, CYMK or HSI image with information on separate color channels) In each color channel—Brightness, Contrast, Saturation
  Full image—Focus
  Verify there is enough tissue (cells) on the slide w/o too many artifacts (also verify that the sample is actually a histological image).
  Before analysis the system checks if there is a complete data set (at least 2× Normal and 4× Carcinoma images)

According to some embodiment of the present invention is provided a Tumor progression and Treatment/Prognosis assessment. This tool is based on the "malignancy index" computed from a specific biopsy, the index is a very sensitive parameter that can indicate the progression of the tumor.

The malignancy index can be used to assess the current malignancy of a specific tumor at the time of the biopsy and can be further used measuring and comparing consecutive biopsy to detect minute changes in the tumor properties over time. These changes can appear due to the flowing reasons:
  Natural advancement of the tumor due to mutagenesis— which may indicate the prognosis (I.e.—big changes in a short period of time=low prognosis and vice versa)
  A result of a therapeutic protocol, which will lower the parameter, indicating of successful treatment.

Hence, the present invention provides a quantitative tool to monitor the tumor and to have earlier detection of improvement or escalation in the tumor status.

According to the present invention it is suggested to use Compression techniques with differential ROI bit rates, for example one of the internal properties of an advanced compression algorithm (such as JPEG2000) is the ability to define ROI's inside the file with different compression rates. It is suggested to uses such compression method by combining a rough segmentation to cover the Nuclei+surrounding area to compress/decompress in Lossless/High bit rate while the rest of the image use lossy/higher compression rates. This solution offers a good compression rates overall w/o losing data for further analysis (i.e. images that are sent to the Database through the internet) and will also benefit peer consultation by Human pathologist who will get the important parts of the images in higher quality. It can also be implemented to "Macro" images by defining different bit rates to different textures/tissues inside the image (I.e.—connective tissue and "empty" regions in high compression and suspicious area in Low compression).

Nuclear roundness factor—NRF and other Morphological features for prognosis prediction. NRF was proposed in the art for predicting the behavior of low-stage cancers. This feature can be used according to the present invention to predict behavior of a Prostate Carcinoma. This information is thus shown separately as an additional feature next to the "Malignancy Index".

There are also few other—rather simple—morphologic features that are already known as a good prognosis predictive on few other tumors. These might be added to the reports of relevant tumor types as important information the pathologist can asses.

According to some embodiments of the present invention is provide a calibrating of the system, by using "Artificial" slide. The diversity of hardware configuration of pathologic end-stations (i.e. PC, camera & microscope), results in different pixel resolutions, dynamic range, light variation etc. of the acquired images. In order to standardize the images and results—an artificial slide comprising of squares of color pattern; resolution pattern; grayscale pattern and typical tissue information. All are printed in high resolution on a microscope slide. The slide is used according to the present invention, to automatically calibrate the end station. The system will retrieve, automatically or semi automatically, known positions on the slide and check the respective information there. In the semi automatic mode the user will be directed to move the slide to the right position based on the system comparison to the known slide pattern stored in it.

The calibration info. will be saved inside the acquired images and will be used during validation, preprocessing and feature extraction.

It is hereby stated that all the processes and modules of the present invention can be applied to a virtual slide and extract the same kind of information. The technology of virtual microscope applies where the whole image is digitized and stored in high magnification.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method for detecting and identifying pathologies in a magnified captured image, said method comprising the step of:
   capturing biopsy of an organ of a human body;
   performing macro image analysis for identifying abnormal and normal segments of the captured image, said analysis based on image texture features extraction and analysis;
   performing conversion of colored images to gray scale image, by applying transformation for each pixel in the image according to pre-defined formula having calculated weights, said transformation is arranged to adjust the colors to normalizing the technical effects of lighting conditions, capturing technique or capturing device type;
   performing segmentation of the gray scale colored biopsy by applying two segmentation levels, a first coarse level preformed by applying different low pass filters on down sized gray scale image for detecting smooth background image and small objects, a fine segmentation level by applying filters on the original size gray scale image for detecting smooth background image and small objects;

merging the image results of the coarse level and the fine level segmentations by expanding the coarse image to fit scale of the fine image and identifying pixels having the same value at both levels;

performing measurements of the detected small objects identifying objects properties and characteristics;

performing comparison between object's properties and characteristics appearing in abnormal segments and object's properties and characteristics appearing in normal segments, and calculating the deviations of each property between the abnormal segments and the normal segments;

ranking objects based on the calculated deviations of each property and characteristic, wherein each property and characteristic has different weight factor determined on the basis of biopsy/organ type.

2. The method of claim 1 further comprising the step of determining suspected objects as pathological or malignant objects based on the objects ranking.

3. The method of claim 2 wherein the tested biopsy is of lymph cells and the object's properties and characteristics appearing in abnormal segments are compared to segments which were determined as pathological or malignant in the detecting and identifying pathologies process applied on biopsy taken from the same human body.

4. The method of claim 3 further comprising the steps of: using conventional feature extraction techniques for identifying the lymphocytes and deleting the identified lymphocytes from the image.

5. The method of claim 1 further comprising the steps of:
automatically staining biopsy cells, wherein objects which were detected thought the segmentation and analyzing processing as abnormal are colored differently than normal object;
performing quantitative calculation of the colored images for preparing statistics of the cells properties enabling to compare the properties between normal and abnormal cells.

6. The method of claim 1 wherein the macro image analysis includes the usage of multi-scale filtering techniques for analyzing image features and using local image histograms for identifying texture properties and characteristics in different area of images.

7. The method of claim 1 wherein the conversion methods provide predefined algorithm adapted to specific staining techniques.

8. The method of claims 1 wherein the segmentation module calculates the difference between Background and Object filtered by comparing to the threshold computed by Otsu's method.

9. The method of claim 1 wherein the weight factor for the ranking module are determined according heuristic human pathologist knowledge translated to classification algorithms and weighted by FL.

10. A system for detecting and identifying pathologies in a magnified captured image, said system comprised of:
a capturing module enabling to capture biopsy of an organ of a human body;
a macro image analysis module for identifying abnormal and normal segments of the captured image, said analysis based on image texture features extraction and analysis;
a gray scale conversion module which apply transformation for each pixel in the image according to pre-defined formula having calculated weights, said transformation is arranged to adjust the colors to normalizing the technical effects of lighting conditions, capturing technique or capturing device type;
a dual segmentation module for applying two segmentation processing levels on the gray scale colored biopsy image, wherein at a first coarse level different low pass filters are applied on down sized gray scale image for detecting smooth background image and small objects and a fine segmentation level different low pass filters are applied on the original size gray scale image for detecting smooth background image and small objects, wherein the image results of the coarse level and the fine level segmentations are merged by expanding the coarse image to fit scale of the fine image and identifying pixels having the same value at both levels;
a comparison module for comparing between measured object's properties and characteristics appearing in abnormal segments and measured object's properties and characteristics appearing in normal segments, and calculating the deviations of each property between the abnormal segments and the normal segments; and
a ranking module for indexing objects based on the calculated deviations of each property and characteristic, wherein each property and characteristic has different weight factor determined on the basis of biopsy/organ type.

11. The system of claim 10 further comprising determining suspected objects as pathological or malignant objects based on the objects ranking.

12. The system of claim 11 wherein the tested biopsy is of lymph cells and the object's properties and characteristics appearing in abnormal segments are compared to segments which were determined as pathological or malignant in the detecting and identifying pathologies process applied on biopsy taken from the same human body.

13. The system of claim 11 wherein the conversion module provides predefined algorithm adapted to specific staining techniques.

14. The system of claims 11 wherein the segmentation module calculate the difference between Background and Object filtered by comparing to the threshold computed by Otsu's method.

15. The method of claim 11 wherein the weight factor for the ranking module are determined according heuristic human pathologist knowledge translated to classification algorithms and weighted by FL.

16. The method of claim 11 further comprising the steps of: using conventional feature extraction techniques for identifying the lymphocytes and deleting the identified lymphocytes from the image.

17. The system of claim 11 wherein the capture module is implemented in mobile phone configuration associated with an optic magnifying lens, a test slide and an illumination source.

18. The system of claim 17 where the diagnosis is done partially on the local image capture device.

19. The system of claim 10 further comprising:
Coloring module for automatically staining biopsy cells, wherein objects which were detected thought the segmentation and analyzing processing as abnormal are colored differently than normal object;
Processing module performing quantitative calculation of the colored images for preparing statistics of the cells properties enabling to compare the properties between normal and abnormal cells.

20. The system of claim 19 further detecting the presence of malignant cells by analyzing the color components of a global camera field of view.

21. The system of claim 10 wherein the macro image analysis include the usage of multi-scale filtering techniques for analyzing image features and using local image histograms for identifying texture properties and characteristics in different area of images.

* * * * *